United States Patent [19]

Mizuno et al.

[11] 4,288,924
[45] Sep. 15, 1981

[54] INSIDE DIMENSION MEASURING GAUGE

[75] Inventors: Ichiro Mizuno; Masao Nakahara, both of Kawasaki, Japan

[73] Assignee: Kabushiki Kaisha Mitutoyo Seisakusho, Tokyo, Japan

[21] Appl. No.: 105,709

[22] Filed: Dec. 20, 1979

[30] Foreign Application Priority Data

Jan. 25, 1979 [JP] Japan .............................. 54-8482[U]

[51] Int. Cl.³ .............................................. G01B 5/12
[52] U.S. Cl. .............................. 33/147 F; 33/147 K; 33/174 Q; 33/178 R
[58] Field of Search ............. 33/178 R, 178 F, 147 K, 33/148 R, 174 Q, 199 R, 147 M, 147 R, 147 F

[56] References Cited

U.S. PATENT DOCUMENTS

| 2,361,336 | 10/1944 | Volis | 33/178 R |
|---|---|---|---|
| 2,434,535 | 1/1948 | Anders | 33/178 R |
| 2,454,246 | 11/1948 | Worthen | 33/178 R |
| 2,566,970 | 9/1951 | Swensson | 33/178 R |
| 2,591,452 | 4/1952 | Maag | 33/178 R |
| 3,995,374 | 12/1976 | Fisk | 33/178 R |
| 4,045,877 | 9/1977 | Rutter | 33/178 R |

FOREIGN PATENT DOCUMENTS

| 1017801 | 10/1957 | Fed. Rep. of Germany | 33/178 R |
|---|---|---|---|
| 85267 | 11/1935 | Switzerland | 33/147 |

Primary Examiner—Willis Little
Attorney, Agent, or Firm—David R. Murphy

[57] ABSTRACT

An inside dimension measuring gauge is disclosed having a spindle within a tubular body which actuates a plurality of contact pistons, the measurement being indicated by sensing the displacement of the spindle. A pair of opposed levers pivotally mounted to the tubular body are provided for axially displacing the spindle with respect to the tubular body upon manual application of a compressive force on the pair of levers. The pair of levers are connected to the axial spindle by a pair of movable links and are further provided with screws for regulating the permitted motion of the levers with respect to the tubular body.

17 Claims, 3 Drawing Figures

INSIDE DIMENSION MEASURING GAUGE

BACKGROUND OF THE INVENTION

The present invention relates to geometrical instruments of the type used to measure the inside dimension of a hole or aperture.

Inside dimension measuring guages of this general class are known in the prior art in which a dial indicator is attached to one end of a tubular body and a spindle installed within the body is caused to push on the contact plunger of the dial indicator. The other end of the tubular body is provided with a measuring contact which moves with the spindle but in a direction normal thereto. Examples of the prior art are to be found in German Pat. No. 437,754, British Pat. No. 1,319,748 and German Offenlegungshrift No. 1,623,311. Other examples of the prior art may be found in the classified collection of art in the U.S. Patent and Trademark Office in Class 33/Subclass 178.

In the guages of the prior art, the spindle has heretofore been provided with a lever for causing an axial displacement of the spindle in response to the manual manipulation of the lever. The function of the lever was to permit insertion of the measuring contact into the hole or orifice of an object for measurement of its inside dimension. The conventional practice for this purpose is to have a single lever pivoted to the tubular body, the lever including a slit on a working surface of the lever. A pin of the spindle engaged into the slit in such a fashion that rotation of the lever directly caused the spindle to be axially displaced.

The prior art inside dimension gauges suffered from a functional deficiency in that the posture of the tubular body was almost inevitably disturbed during the sequence required during the measuring operating, thereby causing the tubular body to lean to one side or another and thus giving inaccurate results. That is, when the measuring contacts were initially withdrawn toward the tubular body by the gripping of the operational lever and the guage then inserted into the hole or orifice of the object sought to be measured, the non-symmetric release of the lever providing for the measuring contacts to protrude outward toward the inside wall of the hole or orifice caused the undesirable displacement.

Since the lever and spindle of the prior art were directly linked, the lever itself had to be made very long if the spindle displacement was to be larger than the lever rotation and consequently this reduced the workability of the mechanism as a whole. Further, the connection by means of slit and pin between the lever and the spindle naturally limited the amount of reduction of the frictional resistance which coule be achieved. Thus, the prior art lever system required a strong force, which together with the presence of only a single lever resulted inevitably in a disturbed posture of the guage upon release of the lever.

Thus, the primary object of the present invention is to assure stable measurement of the inside dimension of a hole or orifice by using two levers situated such that their movement, transmitted over a linkage, displaces the spindle without disturbing the placement of the guage. Another object of the present invention is to make it possible to displace the spindle with a very small force through the use of a lever and link mechanism and thus permit optimum control of the posture of the guage when the lever is released.

SUMMARY OF THE INVENTION

The objects of the present invention are satisfied by providing an inside dimension guage comprising a tubular body having a spindle axially positioned within the body which is slidably displaceable in the axial direction. A plurality of measuring contacts are situated with respect to the spindle so as to move therewith but in a direction normal to the spindle. A pair of levers are pivoted to the tubular body and links connect the free sides of the lever to the spindle in such a fashion that manual compression of the pair of levers acts to axially displace the spindle and withdraw the measuring contacts in a smooth, axially balanced fashion.

One feature of the invention is the presence of pivot points on the tubular body which are symmetrically balanced with respect to the axis of the spindle. Another feature of the present invention is the presence of an adjusting screw for adjusting the amount of movement permitted of the levers. Yet another feature of the present invention is the presence of a main biasing spring which biases the spindle so as to cuase the measuring contacts to protrude in the absence of the application of a force on the levers.

One advantage of an inside diameter measuring gauge of the present invention is that the two levers which provide for displacement of the spindle assure reliable measurement with no disturbance of the gauge once inserted into a measuring position. An additional advantage results from the lever and link mechanism which permits displacement of the spindle upon application of a very small force on the levers thereby enhancing the control of the gauge during a measuring operation.

Other features and advantages of this invention will become apparent from the concrete example thereof shown with reference to the accompanying drawings.

PREFERRED EMBODIMENT OF THE INVENTION

Figure 1:
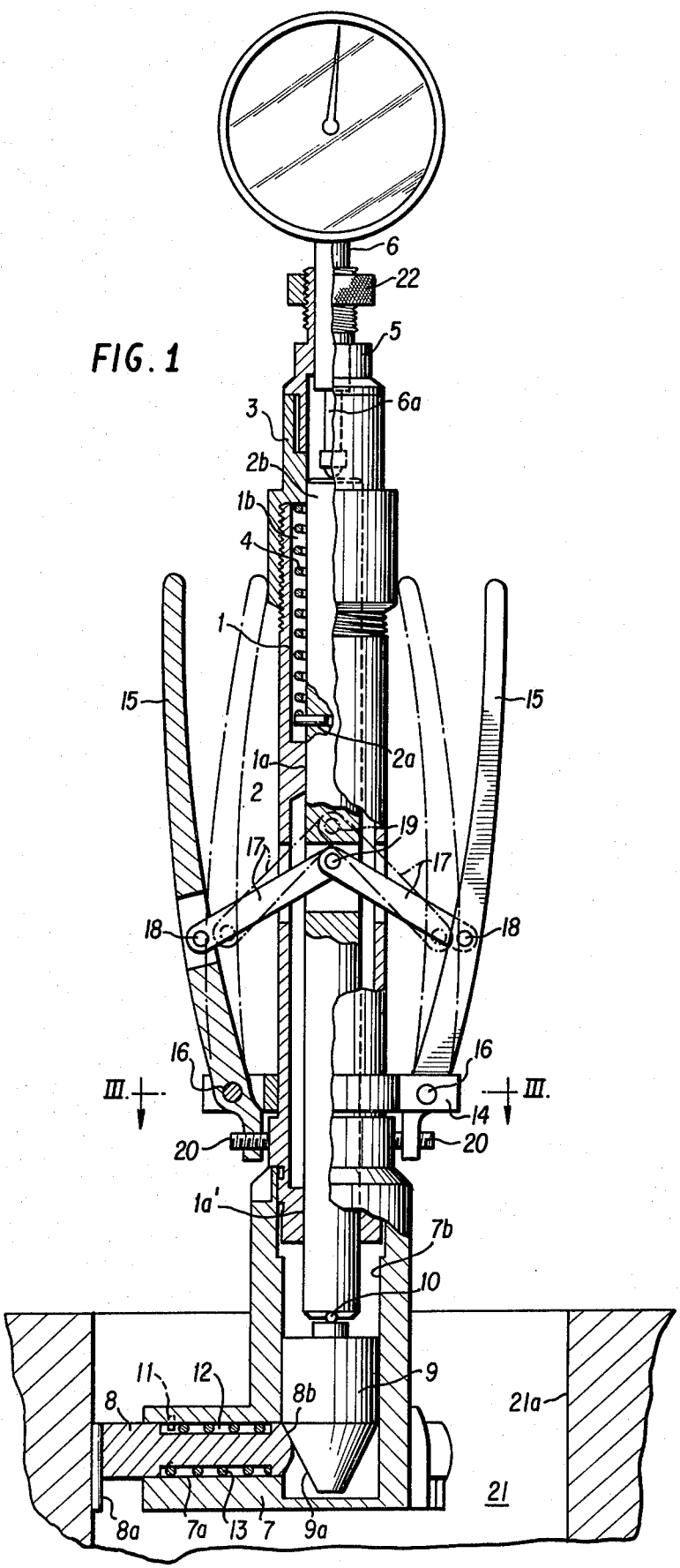
FIG. 1 is an elevation view partially in section of one embodiment of the present invention.

An inside dimension measuring gauge according to the present invention is illustrated in FIG. 1 and is illustrated to have a tubular body 1. A spindle 2 is supported within the tubular body 1 by guide surfaces 1a and 1a' so as to be axially slidable with respect to body 1. A retaining ring in the form of an E-ring 2a is attached approximately at the mid point of spindle 2. A tubular support 3 is attached to the body 1 and contacts a spring 4 which is positioned in a gap 1b between the spindle 2 and the body 1, the spring 4 biasing the spindle 2 in a downward direction by means of a force applied to E-ring 2a.

A dial guage 6 is attached to support 3 by means of a collet 5 and threaded fastener 22 or other appropriate means. The contact plunger 6a of the dial guage 6 is in point contact with the top of spindle 2. In this way, the dial guage 6 indicates the position of spindle 2 in an analog fashion. It is believed to be apparent to those skilled in the art that it would be possible to employ a differential transformer to sense the displacement of spindle 2 and convert that displacement to an electrical signal for digital representation. In this case, the input shaft of the differential transformer would contact the top of spindle 2 in a manner similar to that of the contact plunger 6a of dial guage 6.

A head 7 having three cylinders 7a is secured to the bottom of body 1. Each cylinder 7a is positioned in a direction normal to spindle 2 and holds a measuring block 8 having a measuring contact 8a at its tip which can protrude or withdraw within the cylinder 7a. A movable block 9 is provided within a large diametered cylinder 7b of the head 7 such that it can be displaced in the axial direction of spindle 2. A small contact ball 10 at the lower end of spindle 2 bears on the upper surface of block 9. The bottom of the movable block 9 is conically tapered to form surface 9a while end 8b of the measuring block 8 is similarly tapered such that the two surfaces 8b and 9a are continuously in contact with each other. The movement of block 9a axially is thus converted to a movement of the measuring blocks 8 normal to the axial direction of spindle 2.

While, in the present example, the movement of the measuring blocks 8 is transmitted to the spindle 2 by means of movable block 9 with tapered surface 9a, the same function could be attained by means of a cam or by connecting spindle 2 and the measuring block 8 in a string fashion.

Each of the measuring blocks 8 is provided with a keyway 12 and a key 11 is positioned within the inside surface of each cylinder 7a engaging the keyway 12 so as to prevent rotation of block 8 with repect to cylinder 7a. A spring 13 is interposed between the cylinder 7a and the measuring block 8 so as to bias the measuring block radially inward toward movable block 9.

Figure 2:
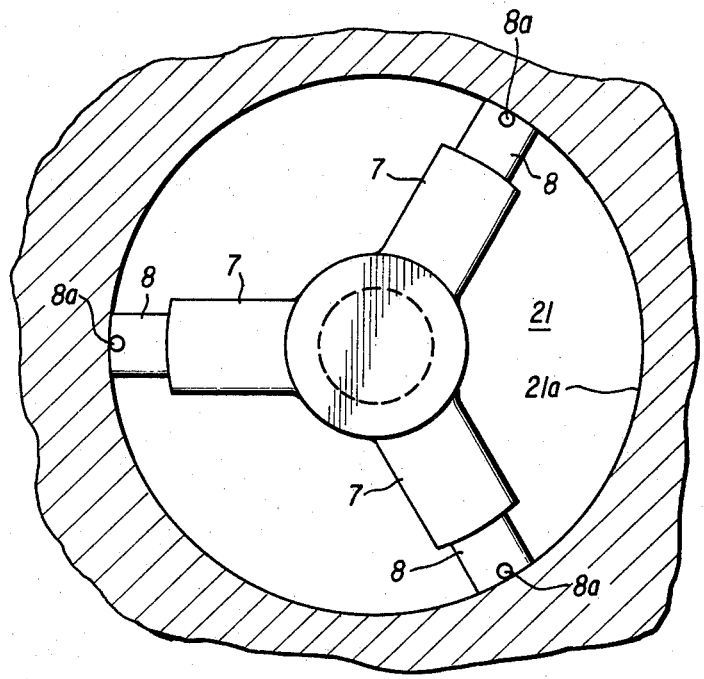
FIG. 2 is a view from the bottom of the embodiment illustrated in FIG. 1.

As illustrated in FIG. 2, the three-point contact of the measuring guage on the inner wall 21a of hole 21 assures accurate measurement of the hole size. It will be appreciated by those skilled in the art that the head 7 illustrated in FIGS. 1 and 2 could be replaced by another head having a lesser or greater number of cylinders 7a for use in other measuring situations in a fashion similar to that disclosed and that the basic operation of the guage would be substantially unchanged.

A pivotal support 14 is provided on the outside of body 1 for pivotally supporting two levers 15. The two levers 15 are rotatably pivoted by pin 16 engaging pivotal support 14 in a symmetrical position centering about body 1.

Figure 3:
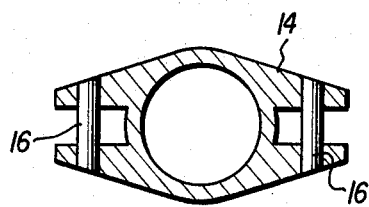
FIG. 3 is a sectional view along line 3—3 of FIG. 1 illustrating only the pivotal support 14.

FIG. 3 illustrates in detail section the pivot support 14 with pivot pins 16 in place. The pivot support 14 can be close-fit pressed or otherwise fixed onto body 1 as may be convenient.

The free end of each lever 15 is in turn pivoted to one end of each link 17 by a pin 18. The other end of each link 17 penetrates body 1 through slots in the sides thereof. The innermost ends of links 17 are overlapped together and pivoted to spindle 2 by a single pin 19. An adjusting screw 20 is provided on each lever 15 on the opposite side of the pivot from link 17 for adjusting the amount of free travel through which lever 15 may move.

An inside diameter measuring guage according to the present invention is operated by gripping the two levers 15 together with one hand, the two levers 15 being squeezed toward the body 1. The two levers 15 thus rotate about pins 16 from the outward positions shown in solid line to the inward position shown in phantom. This causes links 17 to be inwardly and upwardly displaced thereby axially displacing spindle 2 upward against the biasing force of spring 4. The biasing force of springs 13 within the three radial cylinders 7a cause blocks 8 to move radially inward thus displacing block 9 upwardly to follow the upward motion of spindle 2.

The inside dimension measuring guage of the present invention is then inserted into a hole or orifice 21 and the gripping force on levers 15 is gradually relaxed. The biasing force of spring 4 causes spindle 2 and block 9 to be downwardly displaced. As a result, measuring blocks 8 are pushed out against the biasing force of spring 13 until the measuring contacts 8a engage the inner wall 21a of the hole 21. In this condition, the indication of dial guage 6 is read by the gauge operator.

For maximum convenience for storing the guage, the adjusting screw 20 is advanced as far as possible while the levers 15 are squeezed inwardly. In this fashion, the levers may be retained in their inwardmost position and the measuring blocks 8 are simultaneously withdrawn to their maximum inward position for convenient storage of the guage.

The present design for an inside diameter measuring guage provided with two opposed levers for displacement of the spindle assures stable measurement with no disturbance of the guage from the initial inserted condition.

The lever link mechanism illustrated has the added advantage of permitting displacement of the spindle with the application of a very small foce thereby enabling the operator to easily control the posture of the guage within the aperture to be measured. While the foregoing discussion is directed to the illustrated preferred embodiment, the invention encompasses the totality of that within the apended claims.

What is claimed:
1. An inside dimension measuring gauge comprising:
a tubular body;
a spindle within said tubular body slidably movable in the axial direction of the tubular body;
an indicating means fixed to the first end of the tubular body, the indicating means including a contact plunger touching an end of the spindle;
a plurality of measuring contacts situated with respect to the tubular body to move with the spindle in a direction normal to the spindle;
a pair of levers pivoted to said tubular body; and
links connecting the levers to said spindle for inducing axial motion of the spindle in response to a compression or expansion of the levers, the links being pivotally connected to the levers and pivotally connected to said spindle.

2. The inside dimension guage of claim 1 wherein said said levers are symmetrically situated with respect to the axis of said spindle.

3. The inside dimension guage of claim 1 further comprising screw means for adjusting the amount of free travel through which each lever is permitted to move.

4. The inside dimension guage of claim 1 further comprising biasing meas for uring the spindle in the direction cuasing the measuring contacts expand.

5. An inside dimension measuring gauge comprising:
a tubular body having first and second ends;
a spindle situated within said tubular body slidably movable in the axial direction of the tubular body;

an indicating means fixed to the first end of the tubular body, the indicating means including a contact plunger touching an end of the spindle;

a head fixed to the second end of the tubular body comprising a plurality of circumferentially equally spaced cylinders;

a plurality of contact pistons each positioned within one of said cylinders to follow the motion of said spindle but in a direction normal thereto;

a pair of levers pivoted to said tubular body for manual manipulation of the measuring gauge; and a pair of links each pivotally connected to one of said levers and pivotally connected to said spindle such that the manual compression of said levers causes the axial displacement of said spindle and a corresponding radial displacement of said contact pistons.

6. The inside diameter measuring guage of claim 5 wherein said head comprises three cylinders spaced 120° from each other.

7. The inside diameter measuring guage of claim 5 further comprising a moving block situated within said head having a first end in contact with said spindle and having a second end comprising a conically tapered surface in continuous contact with inner ends of each of said contact pistons.

8. The inside diameter measuring guage of claim 5 wherein said head is replaceable with another head differing only in the number of cylinders and contact pistons.

9. The inside diameter measuring guage of claim 5 further comprising a plurality of springs biasing said contact pistons in an inward direction.

10. The inside diameter measuring guage of claim 9 further comprising a main spring biasing said spindle toward said second end, the force of said main spring being greater than that exerted by said plurality of springs biasing the contact pistons in the radially inward position.

11. An inside dimension measuring gauge comprising:
a tubular body having first and second ends;
a spindle situated within said tubular body slidably movable in the axial direction of the tubular body;
an indicating means fixed to the first end of the tubular body, the indicating means including a contact plunger touching an end of the spindle;
a head fixed to the second end of the tubular body comprising a plurality of circumferentially equally spaced cylinders;
a plurality of contact pistons each positioned within one of said cylinders to follow the motion of said spindle but in a direction normal thereto;
a pair of levers pivoted to said tubular body for manual manipulation of the measuring gauge, the levers being symetrically situated with respect to the axis of said spindle;
screw means for adjusting the amount of free travel through which each lever is permitted to move; and
a pair of links each connecting one of said levers to said spindle such that the manual compression of said levers causes the axial displacement of said spindle and a corresponding radial displacement of said contact pistons.

12. An inside dimension measuring gauge comprising:
a tubular body having first and second ends;
a spindle situated within said tubular body slidably movable in the axial direction of the tubular body;
an indicating means fixed to the first end of the tubular body, the indicating means including a contact plunger touching an end of the spindle;
a head fixed to the second end of the tubular body comprising a plurality of circumferentially equally spaced cylinders;
a plurality of contact pistons each positioned within one of said cylinders to follow the motion of said spindle but in a direction normal thereto;
a pair of levers pivoted to said tubular body for manual manipulation of the measuring gauge, the levers being symetrically situated with respect to the axis of said spindle;
screw means for adjusting the amount of free travel through which each lever is permitted to move; and
a pair of links each pivotally connected to one of said levers and pivotally connected to said spindle such that the manual compression of said levers causes the axial displacement of said spindle and a corresponding radial displacement of said contact pistons.

13. The inside diameter measuring gauge of claim 12 wherein said head comprises three cylinders spaced 120° from each other.

14. The inside diameter measuring gauge of claim 12 further comprising a moving block situated within said head having a first end in contact with said spindle and having a second end comprising a conically tapered surface in continuous contact with inner ends of each of said contact pistons.

15. The inside diameter measuring gauge of claim 12 wherein said head is replaceable with another head differing only in the number of cylinders and contact pistons.

16. The inside diameter measuring gauge of claim 12 further comprising a plurality of springs biasing said contact pistons in an inward direction.

17. The inside diameter measuring gauge of claim 16 further comprising a main spring biasing said spindle toward said second end, the force of said main spring being greater than that exerted by said plurality of springs biasing the contact pistons in the radially inward position.

* * * * *